United States Patent
Badiger

(10) Patent No.: US 9,350,911 B2
(45) Date of Patent: May 24, 2016

(54) IMAGE ACQUISITION

(75) Inventor: Aravind Badiger, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 153 days.

(21) Appl. No.: 14/349,132

(22) PCT Filed: Oct. 18, 2011

(86) PCT No.: PCT/US2011/056634
§ 371 (c)(1),
(2), (4) Date: Apr. 2, 2014

(87) PCT Pub. No.: WO2013/058732
PCT Pub. Date: Apr. 25, 2013

(65) Prior Publication Data
US 2014/0253747 A1    Sep. 11, 2014

(51) Int. Cl.
*H04N 5/232* (2006.01)
*H04N 1/00* (2006.01)
*G06F 9/44* (2006.01)

(52) U.S. Cl.
CPC ....... *H04N 5/23203* (2013.01); *H04N 1/00225* (2013.01); *G06F 9/4411* (2013.01); *H04N 2201/0015* (2013.01); *H04N 2201/0081* (2013.01); *H04N 2201/0084* (2013.01)

(58) Field of Classification Search
CPC ..................... H04N 1/00204–1/00244; H04N 1/2166–1/2195; H04N 5/23203–5/23206; G06F 17/30241–17/30997
See application file for complete search history.

(56) References Cited

U.S. PATENT DOCUMENTS

| | | | |
|---|---|---|---|
| 7,072,057 B1 | 7/2006 | Hansen | |
| 7,266,761 B2 | 9/2007 | Levine et al. | |
| 7,712,110 B2 | 5/2010 | Gulkis | |
| 2002/0051195 A1* | 5/2002 | Arakawa | H04N 1/00957 358/1.15 |
| 2002/0063724 A1* | 5/2002 | Powers | H04N 1/00127 345/629 |
| 2005/0259292 A1* | 11/2005 | Tokimoto | H04N 1/00204 358/1.15 |
| 2006/0069815 A1 | 3/2006 | Warner et al. | |
| 2006/0070090 A1 | 3/2006 | Gulkis | |
| 2006/0085516 A1 | 4/2006 | Farr et al. | |
| 2010/0223340 A1 | 9/2010 | Pope et al. | |
| 2010/0262816 A1* | 10/2010 | Klings | G06F 9/44536 713/1 |

FOREIGN PATENT DOCUMENTS

JP         2009230253 A    10/2009

OTHER PUBLICATIONS

"TWAIN Speicfication"; Version 2.1; Jul. 8, 2009; 664 pages.
PCT Search Report/Written Opinion—Application No. PCT/US2011/056634 dated May 11, 2012—8 pages.

* cited by examiner

*Primary Examiner* — Paul Berardesca
(74) *Attorney, Agent, or Firm* — Hewlett Packard Enterprise Patent Department

(57) ABSTRACT

An image acquisition technique includes obtaining information regarding a client ticket within a document of a TWAIN-compliant application and determining if a status associated with the client ticket is complete or incomplete based at least in part on server ticket information associated with the client ticket. An image may then be received for the client ticket if the status associated with the client ticket is complete and the client ticket may be replaced in the document of the TWAIN-compliant application with the image.

14 Claims, 5 Drawing Sheets

IMAGE ACQUISITION

BACKGROUND

TWAIN is a protocol and application programming interface (API) developed by the TWAIN Working Group that regulates bidirectional communication between applications and imaging acquisition devices such as scanners, digital cameras, and image repositories. The TWAIN protocol, in particular, helps to automate and standardize the process of acquiring images from the imaging acquisition devices and providing these images to applications such as word processors, editors, and the like.

BRIEF DESCRIPTION OF THE DRAWINGS

Certain exemplary embodiments are described in the following detailed description and in reference to the drawings, in which.

DETAILED DESCRIPTION

Figure 1:
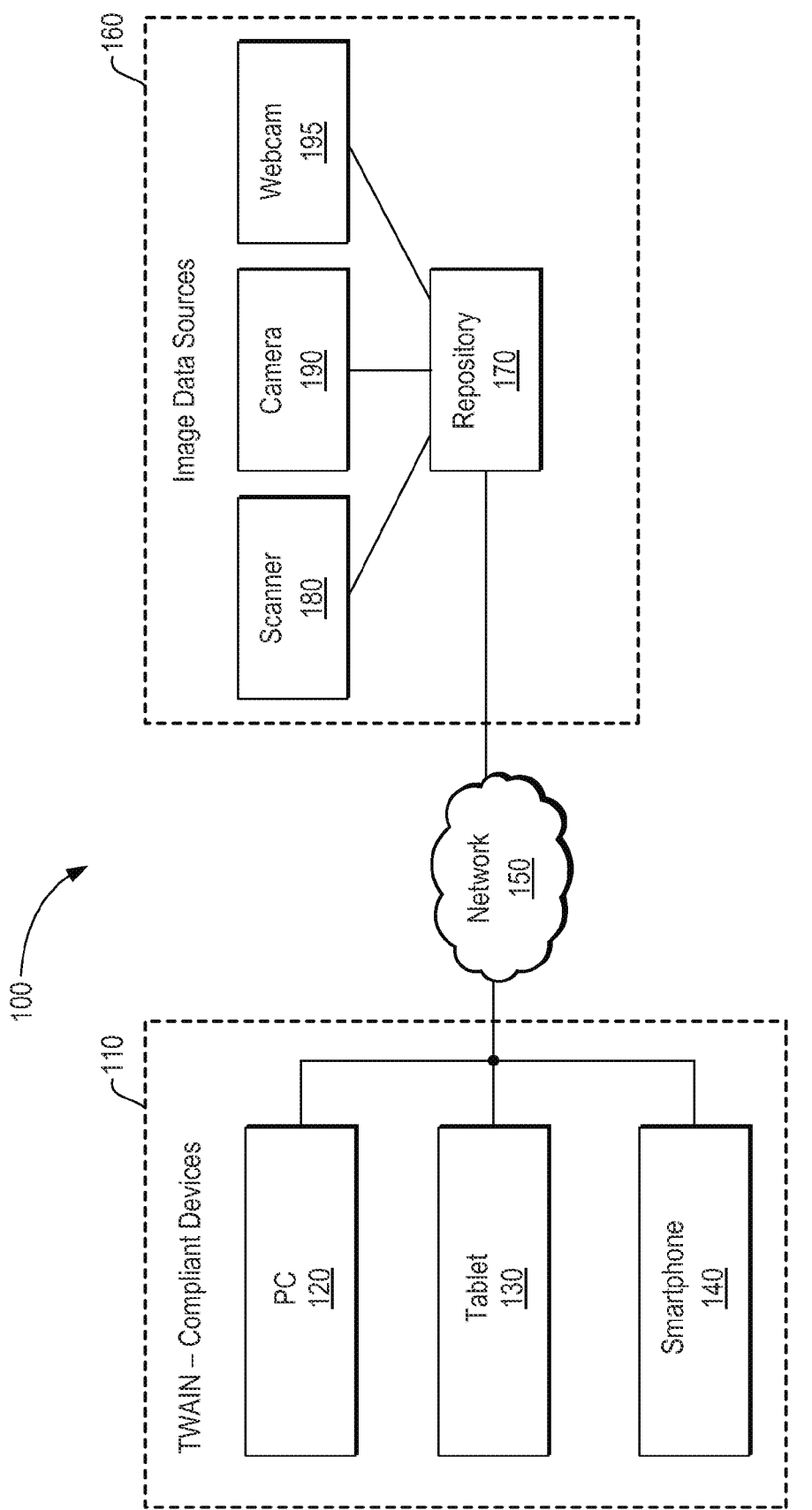
FIG. 1 is a block diagram of a system in accordance with embodiments.

In current TWAIN implementations utilizing a TWAIN-compliant image repository on a network delivering image data to a TWAIN-compliant application running on a client device, the application is blocked from use while the image data is being acquired from the image repository. For example, if a user is creating a document using a word processor application and wishes to insert an image within a portion of the document, the user must select an image source, select a desired image, and receive the desired image before the user may continue further processing with the word processor application. That is, the user is blocked from inputting further text or conducting other operations until the requested image data is retrieved from the image data source and inserted into the document. While this TWAIN blocking constraint may be acceptable in some instances (e.g., the image is readily available in the image repository), in other instances, such as when the image is not currently available at an image repository because the user has not yet scanned the image to the image repository, this process may not be acceptable. Rather, the user may prefer to conduct textual input or other operations and, at a later time, make the images available at the image repository.

Disclosed herein are embodiments that provide for a non-blocking TWAIN experience wherein, for example, a user may initiate a TWAIN image acquire action and continue using an application even if the image is not currently available at the image source. More specifically, the user may initiate an image acquire action, insert an image "placeholder" into the document, and replace the placeholder with the image at a later point when the image is available. This process may reduce current inefficiencies caused by a user having to suspend work in order to conduct processes to satisfy the TWAIN image acquisition. For example, this may reduce inefficiencies caused by a user having to suspend textual input and walk-up to a scanner in order to scan an image to an image repository.

Some embodiments described herein are directed to an image acquisition method. The image acquisition method comprises initiating an image capture request via a TWAIN-compliant application, receiving server ticket information for the image capture request from a repository, creating a client ticket based on the server ticket information, inserting the client ticket into a document of the TWAIN-compliant application, determining a status for the client ticket based at least in part on the server ticket information, receiving an image from the repository, and replacing the client ticket in the document of the TWAIN-compliant application with the image. This process may overcome the above-mentioned blocking issues associated with current TWAIN implementations because a client ticket or "placeholder" is inserted into the document and replaced at a later time when the image is available at the repository.

Additional embodiments are also directed to an image acquisition method. This image acquisition method comprises obtaining information regarding a client ticket within a document of a TWAIN-compliant application, determining if a status associated with the client ticket is complete or incomplete based at least in part on server ticket information associated with the client ticket, receiving an image for the client ticket if the status associated with the client ticket is complete, and replacing the client ticket in the document of the TWAIN-compliant application with the image. Similar to the above-mentioned method, this method may overcome inefficiencies associated with current TWAIN implementations by checking the status of previously inserted client tickets in a document and replacing those client tickets that are made available at the image source with corresponding images.

Further embodiments are directed to a processor-readable storage medium. The processor-readable storage medium includes processor-executable instructions that, when executed, cause a processor to obtain information regarding a client ticket within a document of a TWAIN-compliant application, determine if a status associated with the client ticket is complete or incomplete based at least in part on server ticket information associated with the client ticket, receive an image for the client ticket if the status associated with the client ticket is complete, and replace the client ticket in the document of the TWAIN-compliant application with the image. Consistent with above, these instructions cause a processor to replace previously inserted client tickets with images that have been, e.g., scanned to the repository or otherwise completed. Thus, for example, a user that is working on a long document with numerous images may insert image placeholders into the document, proceed with typing the document, and, at later time, associate various images with the placeholders an that the placeholders may be replaced with images. As one can imagine, this arrangement may reduce inefficiencies caused by a user potentially having to pause textual input in order to walk-up to a scanner and scan images that were not previously available at an image repository.

FIG. 1 is a block diagram of a system 100 in accordance with embodiments. The system 100 may comprise a TWAIN-compliant device 110 communicating with an image data source 160 via a network 150. The TWAIN compliant device 110 may be, for example, a personal computer (PC) 120, a tablet 130, a smartphone 140 or another computing device capable of running a TWAIN-compliant application. The image data source 160 may be, for example, a repository 170, a scanner 180, a camera 190, a webcam 195, or another device arranged to store or capture image data. In some embodiments, the scanner 180, the camera 190, and/or the webcam 195 may capture images and store the captured images on the repository 170. These images may be stored in various formats including, but not limited to, the portable document format (PDF), the portable network graphics (PNG) format, the joint photographic experts group (JPEG) format, the graphic interchange format, (GIF), the tagged image file format (TIFF), and/or the raw image format. The TWAIN-compliant device 110 may access the repository 170 via the network 150 to obtain the images for insertion into a document of a TWAIN-compliant application (e.g., Microsoft Word™).

In embodiments, the repository 170 may be a document repository such as a hard copy repository (HCR). The HCR may be configured to manage a plurality of documents for an organization. Alternatively or in addition, the repository 170 may be a centralized or dispersed system that stores scanned documents and/or other electronic documents. The repository 170 may include search capability that enables TWAIN-compliant devices 110 to locate and retrieve documents from the repository 170, as well as check-out and check-in documents. The repository 170 may further provide document distribution options (e.g., email and file transfer protocol (FTP) options).

The image data source(s) 160 may be accessed by the TWAIN-compliant device(s) 110 via a communication network 150. The communication network 150 may comprise one or more networks including, but not limited to, wired/wireless networks, local area networks (LANs), wide area network (WANs), telecommunication networks, the Internet, an Intranet, computer networks. Bluetooth networks, Ethernet LANs, token ring LANs, Inter-Integrated Circuit ($I^2C$) networks, serial advanced technology attachment (SATA) networks, and/or serial attached SCSI (SAS) networks. Such networks may utilize communication mediums including, but not limited to, copper, fiber optics, coaxial, unshielded twisted pair, shielded twisted pair, heliax, radio frequency (RF), infrared (IR), and/or microwave.

Figure 2:
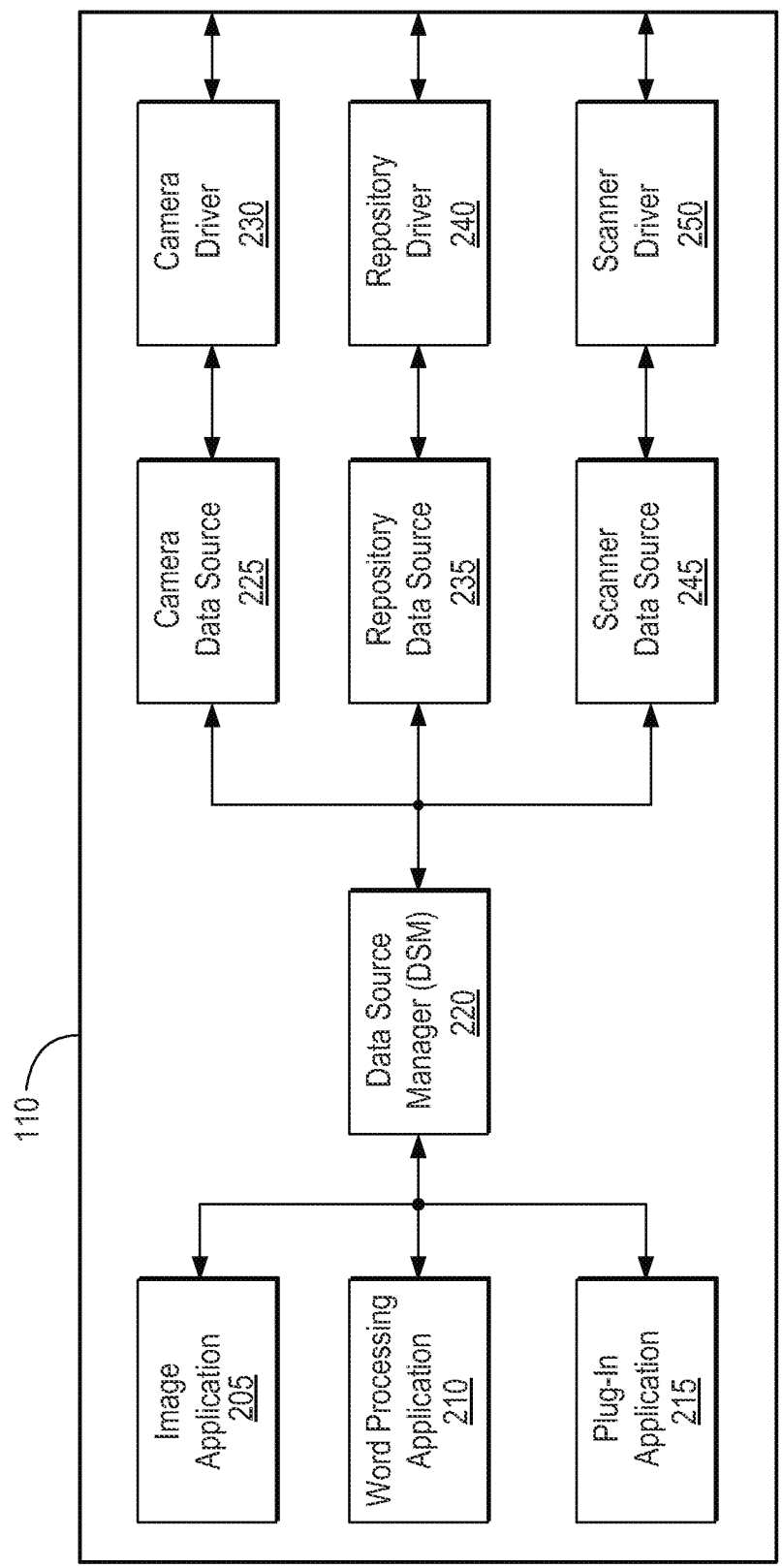
FIG. 2 is a block diagram of a TWAIN-compliant device in accordance with embodiments.

FIG. 2 is a block diagram of a TWAIN-compliant device 110 in accordance with embodiments. As shown, the TWAIN-compliant device 110 may comprise a plurality of TWAIN-compliant applications. For example, the TWAIN-compliant device 110 may include an image application 205 (e.g., PhotoShop™) and word processing application 210 (e.g., Microsoft Word™). These TWAIN-compliant applications (205 and 210), when executed by one or more processors, may be the consumers of image data produced by the image data sources 160 referenced in FIG. 1. In some embodiments, these TWAIN-compliant applications may utilize a plug-in application (215) in order to perform operations described herein. The plug-in application 215 may provide customized functionality to the TWAIN-compliant applications (205 and 210) and enable the TWAIN-compliant applications to perform image acquisition operations in the manner described herein.

In addition to the TWAIN-compliant applications (205 and 210) and/or plug-in application (215), the TWAIN-compliant device 110 may further comprise a data source manager 220, data sources (225, 235, and 245), and drivers (230, 240, and 250). The data source manager 220 may be configured to manage the interconnections between the TWAIN-compliant applications (205 and 210) and the data sources (225, 235, and 245). The data sources (225, 235, and 245) may be configured to control image acquisition in accordance with the TWAIN specification and may be the TWAIN interface implementation on the TWAIN-compliant application side that moves through different TWAIN states as decided by the TWAIN-compliant application (205 and 210). The drivers (230, 240, and 250) may be dynamic link libraries that the associated data sources (225, 235, and 245) may utilize to load and make device specific calls. Each image source may have its own driver and data source. For example, camera 190 may have an associated camera data source 225 and camera driver 230, scanner 180 may have an associated scanner data source 245 and scanner driver 250, and repository 170 may have an associated repository data source 235 and repository driver 240.

Figure 3:
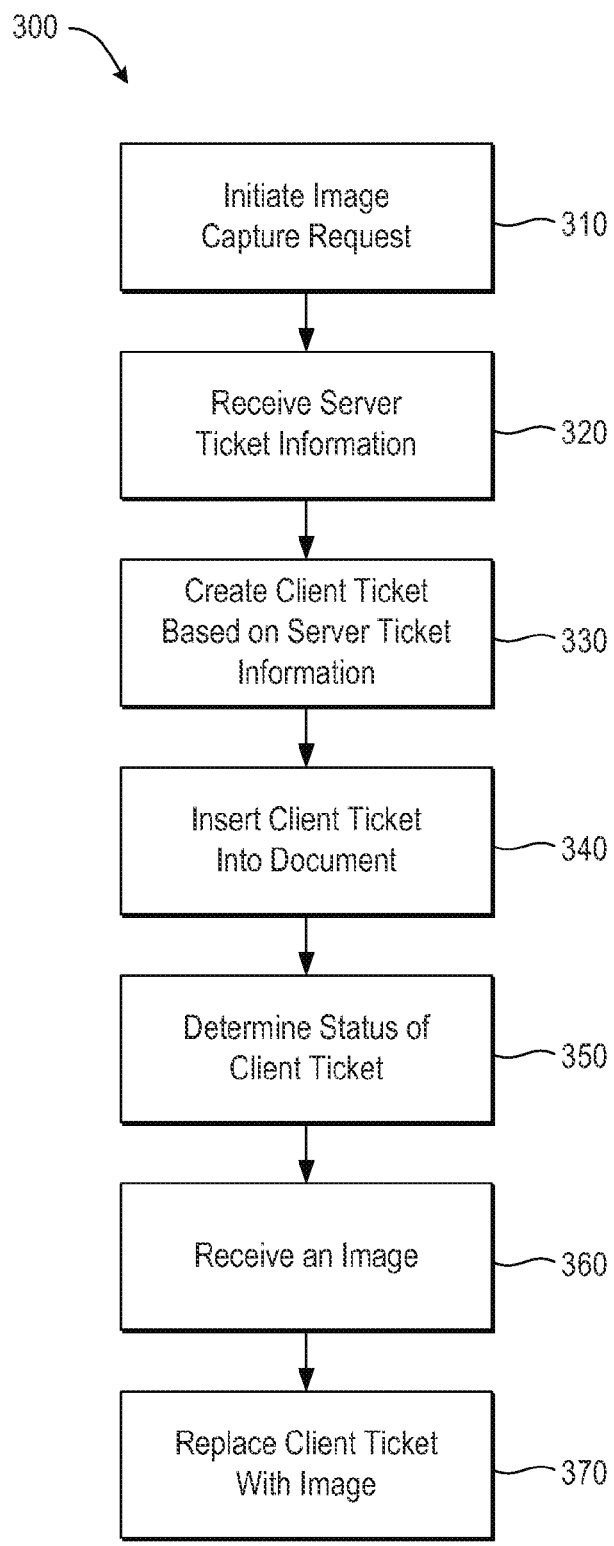
FIG. 3 is a process flow diagram of an image acquisition method in accordance with embodiments.

FIG. 3 is a process flow diagram of an image acquisition method in accordance with embodiments. The method 300 may be performed by a TWAIN-compliant device 110 as shown in FIG. 1. The method 300 may begin at block 310, when an image capture request is initiated via a TWAIN-compliant application (205 and 210). This may occur after the TWAIN-compliant application (205 and 210) is initiated and running on the TWAIN-compliant device 110, and in response to a user selection of an option to insert an image into a document. For example, a user may open a TWAIN-compliant application such as the word processor application 215 and select an option to insert an image from repository 170 into a document. In response, the word processor application 215 may initiate an image capture request to the selected image source (e.g., repository 170). Initiation of the image capture request may comprise operations by the TWAIN-compliant application (205 and 210), data source manager (220), data source (225, 235, and 245), and/or driver (230, 240, 250) proceeding through one or more TWAIN specification states. In particular, the following is a listing of different TWAIN specification states that may be executed as part of the image capture request initiation: (a) TWAIN-compliant application loads data source manager, (b) TWAIN-compliant application obtains an entry point for the data source, (c) TWAIN-compliant application requests an image source to open, (d) data source, once opened, shows its user interface to and users, and (e) the TWAIN-compliant application inquires about image information.

Upon receiving an image capture request triggered in block 310, the image data source 160 (e.g., a repository) may create a server ticket. More precisely, a TWAIN responder associated with the image data source 160 may create the server ticket for the received image capture request. The TWAIN responder may be an image data source component that can respond to a client request over a network. The server ticket may be a representation of a user-specific incomplete ticket on the image data source 160 and may comprise, e.g., a ticket identifier, a user name, and/or scan settings. The ticket identifier may be used to identify/associate the server ticket with a client ticket. The user name may be used to scope a user's view when the user logs into the image repository. The scan setting may be used to apply such setting when an image is scanned to the ticket.

Once created, the image data source 160 may send information about the server ticket to the TWAIN-compliant device 110 over the network 150. More specifically, a TWAIN responder of the image data source 160 may transmit information about the server ticket over the network 150 to a driver of the TWAIN-compliant device 110. For example, a TWAIN-responder associated with repository 170 may create a server ticket after receiving an image capture request from the word processor application 210, and send information about the server ticket to the repository driver 240.

At block 320, the TWAIN-compliant device 110 may receive the server ticket information for the image capture request from the image data source 160. More precisely, a driver of the TWAIN-compliant device 110 may receive the server ticket information from a TWAIN-responder of an image data source 160. For example, the repository driver 240 may receive server ticket information from a TWAIN-responder associated with repository 170. This server ticket information may be provided, for example, in the form of an extensible markup language (XML) response.

At block 330, a client ticket may be generated based on the received server ticket information. This process may be conducted by the driver. For example, the repository driver 240 may generate a client ticket based on the server ticket information received from a TWAIN-responder associated with repository 170. The client ticket may be a client side representation of an incomplete server ticket. The client ticket may comprise a server ticket identifier, a data source name, and/or an image data source identifier in terms of an internet protocol (IP) address. In embodiments, the client ticket may be in the form of binary data. For example, the client ticket may be a bitmap image with a modified header to include server ticket information. That is, the server ticket information may be included into a "dummy" bitmap image file. This could be done by embedding binary serialized data of the client ticket into the area of a pixel array that the bitmap contains. Alternatively, a bitmap header may be used to indicate the offset into the pixel array where this data is written. In some embodiments, the bitmap may not be a valid image, but may nonetheless include client ticket information in a known place in the bitmap format and provide this image to the application. Furthermore, in some embodiments, the client ticket may be generated in the form of a quick response (QR) code. That is, the client ticket information may be encoded in a QR code rendered as a valid bitmap.

Once the client ticket is created, at block 340, the client ticket may be inserted into a document of the TWAIN-compliant application. In embodiments, this may comprise a driver (230, 240, and 250) communicating to a data source (225, 235, and 245) that it has created a client ticket. The data source may then provide the generated client ticket to the TWAIN-compliant application (205 and 210). For example, the repository driver 240 may indicate that it has created a client ticket to the repository data source 235, and the repository data source 235 may provide the client ticket to a word processing application 215 for insertion in a portion of a document. The TWAIN-compliant application, upon receiving the client ticket, may insert the client ticket into the document believing it to be a valid image. In actuality, however, the client ticket may not be a valid image, and may be a "placeholder" comprising information about a server ticket (e.g., a bitmap comprising server ticket information in the pixel array of the bitmap and the header containing its offset in the pixel array). The client ticket may be displayed in the document as, e.g., an empty pixel array, a question mark, a QR code, etc. The user may then continue using the application and continue inserting placeholders or client tickets as necessary.

At a later point, the user may conduct processes to "complete" the server ticket. That is, the user may conduct the necessary processes to associate an image with a server ticket and replace the placeholder with an image. For example, the user may walk-up to a network scanner, select a server ticket, and scan an image to the selected server ticket. By doing so, the server ticket becomes "complete" and the image may be available to replace a placeholder. Alternatively, the user may browse various pre-scanned images on the repository via the scanner and/or the TWAIN-compliant device 110 and associate various pre-scanned images with various server tickets, making such server tickets "complete." Furthermore, the user may browse the repository 170 and select a document (e.g., a PDF document) and a page number in that document. The selected page of the optical document may then be extracted and associated with the intended server ticket.

At block 350, a status for the client ticket(s) may be determined based at least in part on the server ticket information. This process may occur automatically in response to a user re-initiating the TWAIN-compliant application and/or document associated therewith. For example, a user may open a word processor document with client tickets previously stored therein and this action may automatically trigger the TWAIN-compliant application to check the status of the client ticket(s) within the document. Alternatively, the user may manually trigger the process via an option within the TWAIN-compliant application. For example, a user may select an option or icon on the TWAIN-compliant application to check the status of all pending client tickets.

The process of determining the status may comprise the TWAIN-compliant application (205 and 210) and/or or a plug-in application (215) associated therewith enumerating all client tickets in the document and communicating with a driver to check the status of each client ticket at an image data source 160. The driver may than send a request to a TWAIN responder associated with the image data source 160 requesting the status of one or more client tickets and/or associated server tickets. The TWAIN responder may check the status and respond back with the status of the one or more client tickets and/or the associated server tickets. For example, there may be five client tickets within a word processor document. The word processor application 210 may cause the repository driver 240 to ask the TWAIN responder of the repository 170 the status of the five client tickets by providing the server ticket information for the five client tickets. The TWAIN responder may check the status of the five server tickets and respond back to the repository driver 240 with the information as to which server tickets are complete or incomplete. The repository driver 240 may then initiate or request an image transfer for the client/server tickets that are determined to be complete.

At block 360, images are received at the TWAIN-compliant device 110. In particular, the driver of the TWAIN-compliant device 110 may receive the images that are complete from the TWAIN responder associated with an image data source 160. For example, the repository driver 240 may receive images from the TWAIN responder of the repository 170.

At block 370, the placeholder(s) within the document of the TWAIN-enabled application may be replaced with the received image(s). This may be conducted by the TWAIN-compliant application (205 and 210) and/or a plug-in application (215) associated therewith.

Accordingly, the above-mentioned processes enable an application to initiate a TWAIN acquire action without blocking and receive images at a later point. More specifically, the above-mentioned processes implement a non-blocking, late synchronization TWAIN experience by initiating an image capture request via a TWAIN-compliant application and receiving server ticket information for the image capture request. The server ticket information is used to create a client ticket and the client ticket is inserted into a document of the TWAIN-compliant application in, e.g., a binary format. Multiple such client tickets may be inserted into the document and, at a later point, the status of each client ticket may be determined automatically or in response to a user command. Images are than received for the client tickets that are determined to be associated with a complete server tickets. These images are used to replace the client tickets within the document.

In some embodiments, a plug-in application (215) may be used to conduct one or more of the above-discussed operations. For example, the plug-in application (215) may enumerate client tickets, issue an image status requests for the client tickets, and replace the client tickets in the document with received images. In alternate embodiments, the TWAIN-compliant application and the data source may be modified to support an operation called DAT_ASYNCTICKETS. In these embodiments, after client tickets are inserted into a document, the user may be presented an option to "process existing client tickets." Selection of this option may cause the data source to move through a DAT_ASYNCTICKETS operation to obtain information on image availability and to obtain completed images. The TWAIN-compliant application then, through the DAT_ASYNCTICKETS operation, may replace client tickets with images.

Figure 4:
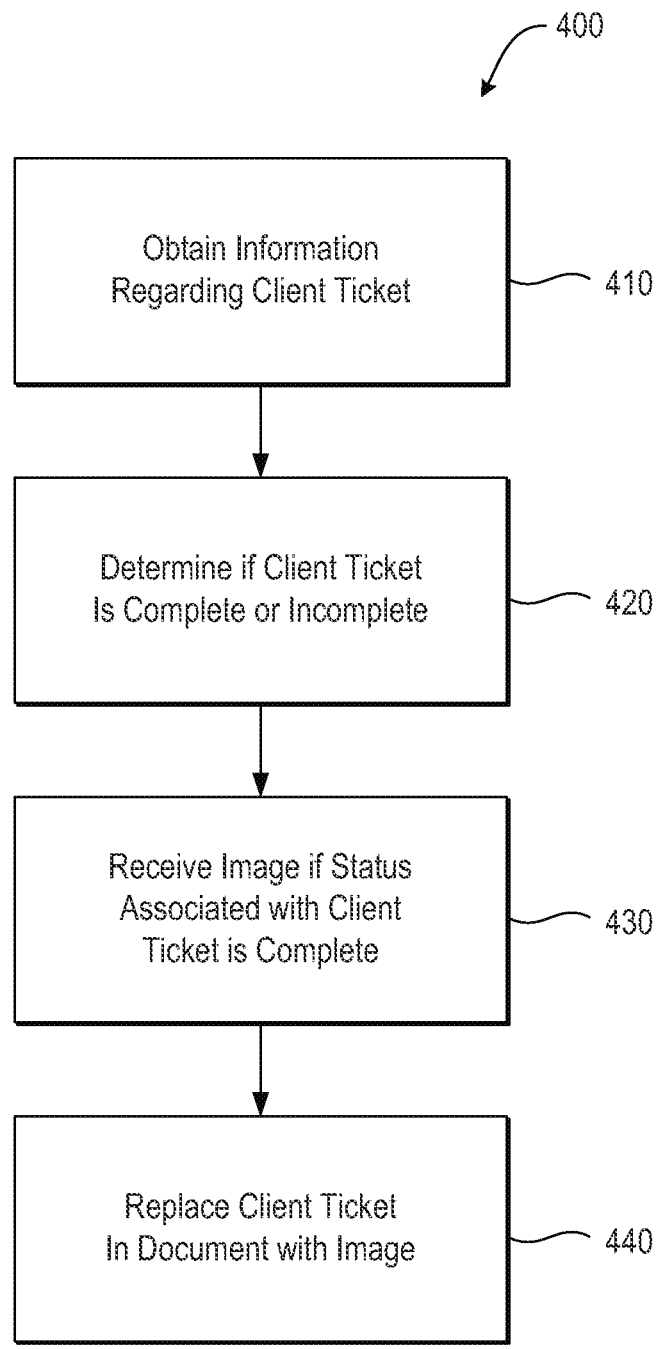
FIG. 4 is a process flow diagram of an image acquisition method in accordance with embodiments.

FIG. 4 is a process flow diagram of another image acquisition method in accordance with embodiments. The method 400 may be performed by a TWAIN-compliant device 110 as shown in FIG. 1. The method 400 may begin at block 410, where information regarding a client ticket within a document of a TWAIN-compliant application is obtained. The process may occur in response to the initiation of a TWAIN-compliant application and/or associated document, or in response to a user-initiated event.

At block 420, the status of the obtained client ticket(s) may be determined. In particular, a check may be done for each client ticket, and each client ticket may be identified as complete or incomplete based at least in part on server ticket information associated with the client ticket. A TWAIN responder of an image data source 160 may provide this information to the TWAIN-compliant device 110, and therefore put the TWAIN-compliant device 110 on notice of which client tickets have images available. The TWAIN-compliant device 110 may then, at block 430, receive an image for each client ticket that is complete. The client tickets in the document may then be replaced with the images at block 440.

Figure 5:
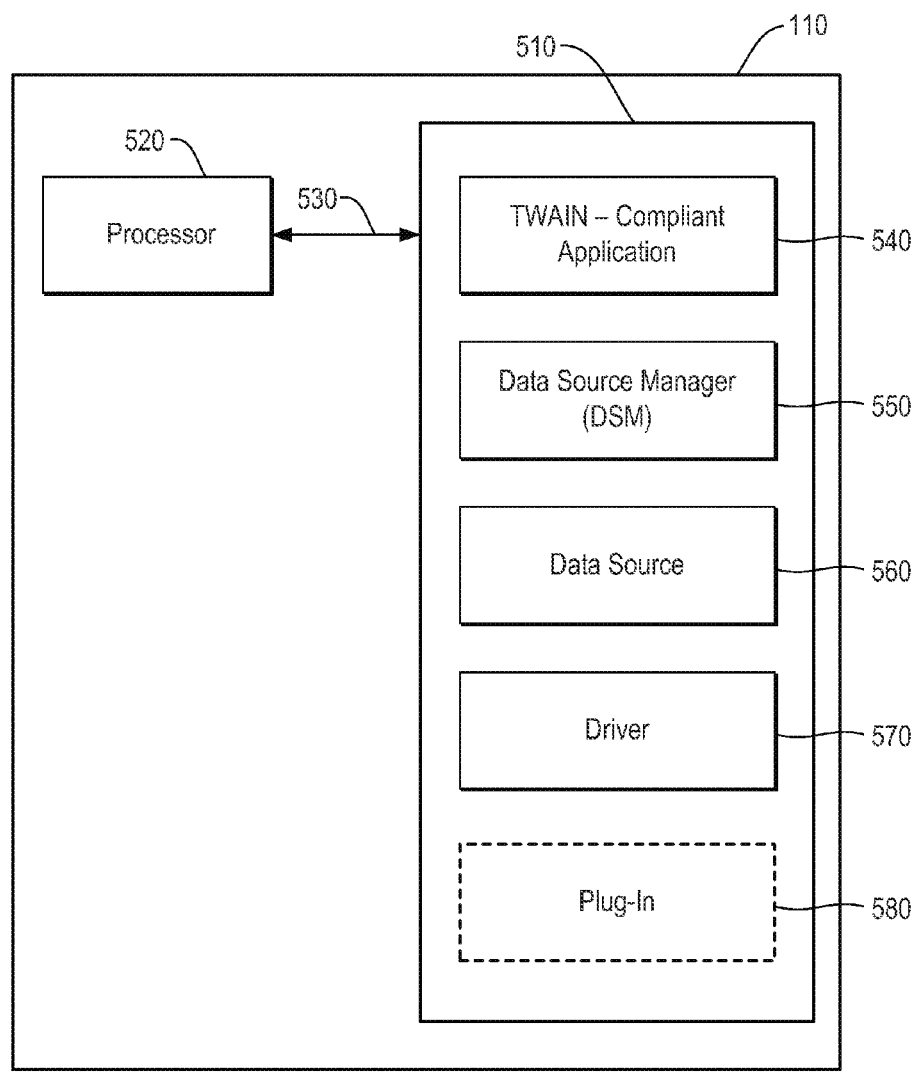
FIG. 5 is a block diagram showing a processor-readable medium having processor-executable instructions stored thereon that, when executed, cause a processor to conduct processes in accordance with embodiments.

FIG. 5 is a block diagram showing a processor-readable medium having processor-executable instructions stored thereon that, when executed, cause a processor to conduct processes in accordance with embodiments. The processor-readable medium is generally referred to by reference number 510 and may be included in the TWAIN-compliant device 110 described in relation to FIG. 1. The processor-readable medium 510 may correspond to any typical storage device that stores instructions, codes, data, and/or other information. As used herein, a processor-readable medium 510 is any medium that stores instructions, codes, data, or other information non-transitorily and is directly or indirectly accessible to a processor 520. Said differently, a processor-readable medium 510 is a non-transitory medium at which a processor 520 can access instructions, codes, data, or other information. For example, the processor-readable medium 510 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a Compact-Flash™ (CF) card, or a combination thereof or other memories. In some embodiments, the instructions may part of an installation package that may be executed by the processor 520 to implement the TWAIN-compliant application (205 and 210), plug-in application 215, DSM 220, data source (225, 235, and 245), and/or driver (230, 240, and 250). For example, the processor-readable medium 510 may be a portable medium such as a CD, DVD, or flash drive or a memory maintained by a server from which the installation package can be downloaded and installed. In another example, the instructions may be integrated in the same device as the processor 520 or it may be separate but accessible to that device and processor 520. In some implementations, the processor-readable medium 510 can be integrated with processor 520, separate from processor 520, or external to the TWAIN-compliant device 110. Furthermore, in some implementations, the processor-readable medium 510 includes two or more different processor-readable media.

The processor 520 generally retrieves and executes the instructions stored in the processor-readable medium 510 to conduct image acquisition in accordance with embodiments. In an embodiment, the processor-readable medium 510 can be accessed by the processor 520 over a bus 530. A first region 540 of the processor-readable medium 510 may include the TWAIN-compliant application functionality as described herein. A second region of the processor-readable medium 550 may include the data source manager (DSM) functionality as described herein. A third region of the processor-readable medium 560 may include the data source functionality as described herein. A fourth region of the processor-readable medium 570 may include driver functionality as described therein. A fifth region of the processor-readable medium 580 may include plug-in functionality as described herein.

Although shown as contiguous blocks, the software components can be stored in any order or configuration. For example, if the non-transitory processor-readable medium 510 is a hard drive, the software components can be stored in non-contiguous, or even overlapping, sectors.

What is claimed is:

1. A non-transitory processor-readable storage medium having processor-executable instructions stored thereon that, when executed, cause a processor to:
   initiate, by the processor, an image capture request via a TWAIN-compliant application;
   provide, by the processor, the image capture request to a repository, the repository being implemented in hardware that is separate from the processor;
   receive, by the processor and from the repository, server ticket information for the image capture request;
   create, by the processor and in response to receipt of the server ticket information, a client ticket based on the server ticket information;
   insert, by the processor, the client ticket into a document of the TWAIN-compliant application;
   provide the repository with a request for an image, the request being based on the client ticket;
   receive, by the processor, the image from the repository; and
   replace, by the processor, the client ticket in the document of the TWAIN-compliant application with the image.

2. The processor-readable storage medium of claim 1, wherein the server ticket information comprises at least a server ticket identifier, and wherein the client ticket comprises at least the server ticket identifier and a repository identifier.

3. The processor-readable storage medium of claim 1, wherein the processor-executable instructions further cause the processor to:
   send a status request to the repository with the server ticket information and receiving a status response from the repository.

4. The processor-readable storage medium of claim 1, wherein the client ticket comprises a quick response (QR) code rendered as a bitmap.

5. The processor-readable storage medium of claim 1, wherein the client ticket is in a binary format with metadata comprising the server ticket information.

6. An image acquisition method comprising:
- obtaining information regarding a client ticket within a document of a TWAIN-compliant application;
- requesting, from a repository, a status of an image capture request associated with the client ticket, the request including server ticket information;
- receiving, from the repository and in response to the status request, a complete status indicator that indicates the image capture request associated with the client ticket is complete;
- requesting, from the repository and in response to receiving the complete status indicator, an image associated with the image capture request;
- receiving, from the repository, the requested image; and
- replacing the client ticket in the document of the TWAIN-compliant application with the image.

7. The method of claim 6, wherein the server ticket information comprises at least a server ticket identifier, and wherein the client ticket comprises at least the server ticket identifier and a repository identifier.

8. The method of claim 6, wherein the client ticket comprises a quick response (QR) code rendered as a bitmap.

9. The method of claim 6, wherein the client ticket comprises a bitmap with a header modified to include the server ticket information.

10. A non-transitory processor-readable storage medium having processor-executable instructions stored thereon that, when executed, cause a processor to:
- obtain information regarding a client ticket within a document of a TWAIN-compliant application;
- request, from a repository, a status of an image capture request associated with the client ticket, the request including server ticket information;
- receive, from the repository and in response to the status request, a complete status indicator that indicates the image capture request associated with the client ticket is complete;
- request, from the repository and in response to receiving the complete status indicator, an image associated with the image capture request;
- receive, from the repository, the requested image; and
- replace the client ticket in the document of the TWAIN-compliant application with the image.

11. The processor-readable storage medium of claim 10, wherein the server ticket information comprises at least a server ticket identifier, and wherein the client ticket comprises at least the server ticket identifier and a repository identification.

12. The processor-readable storage medium of claim 10, wherein the client ticket comprises a quick response (OR) code rendered as a bitmap.

13. The processor-readable storage medium of claim 10, wherein the processor-executable instructions cause a processor to determine if the status associated with the client ticket is complete or incomplete based at least in part on the server ticket information associated with the client ticket by sending a status request to a repository with the server ticket information and receiving a status response from the repository.

14. The processor-readable storage medium of claim 10, wherein the client ticket comprises a bitmap with a header modified to include the server ticket information.

* * * * *